(12) United States Patent
Yap et al.

(10) Patent No.: US 9,103,914 B2
(45) Date of Patent: Aug. 11, 2015

(54) OPTICAL ANGLE OF ARRIVAL SENSORS AND METHODS FOR DETERMINING AN ANGLE OF ARRIVAL OF INCIDENT LIGHT

(71) Applicant: The Boeing Company, Chicago, IL (US)

(72) Inventors: Daniel Yap, Newbury Park, CA (US); Donald A. Hitko, Grover Beach, CA (US); Hasan Sharifi, Agoura Hills, CA (US); Oleg M. Efimov, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 14/138,037

(22) Filed: Dec. 21, 2013

(65) Prior Publication Data
US 2015/0177381 A1    Jun. 25, 2015

(51) Int. Cl.
*G01S 17/42* (2006.01)
*G01B 11/26* (2006.01)

(52) U.S. Cl.
CPC ............... *G01S 17/42* (2013.01); *G01B 11/26* (2013.01)

(58) Field of Classification Search
CPC ........................................ G01S 17/42
USPC .......................................... 356/138
See application file for complete search history.

(56) References Cited

U.S. PATENT DOCUMENTS

| | | | | |
|---|---|---|---|---|
| 3,858,201 A * | 12/1974 | Foster | ............................... | 341/9 |
| 4,624,563 A * | 11/1986 | Johnson | ..................... | 356/141.3 |
| 4,626,100 A * | 12/1986 | Johnson | ..................... | 356/141.3 |
| 5,319,188 A * | 6/1994 | Cole | ......................... | 250/206.2 |
| 8,334,499 B2 * | 12/2012 | Ma et al. | ....................... | 250/216 |
| 8,441,626 B2 * | 5/2013 | Wen | .............................. | 356/123 |
| 2010/0230577 A1 * | 9/2010 | Ma et al. | .................... | 250/208.1 |
| 2012/0154794 A1 * | 6/2012 | Wen | ............................... | 356/123 |

* cited by examiner

*Primary Examiner* — Roy M Punnoose
(74) *Attorney, Agent, or Firm* — Joseph M. Butscher; The Small Patent Law Group, LLC

(57) ABSTRACT

Optical angle of arrival sensors and methods for determining an angle of arrival of incident light are provided, wherein one sensor includes a focusing lens and an array of lateral-effect position sensing detector (LEPSD) elements. The focusing lens is configured to focus light on the array, wherein each of the LEPSD elements includes an absorber region that absorbs light of a first wavelength range that is focused on the LEPSD elements. Each of the LEPSD elements further includes at least one lateral current conducting layer that has a relatively low sheet resistance.

35 Claims, 12 Drawing Sheets

MWIR/LWIR light to imager

Y-position offset:

$$Y = K_Y \frac{I_{Y1} - I_{Y2}}{I_{Y1} + I_{Y2}} \times \frac{L}{2}$$

X-position offset:

$$X = K_X \frac{I_{X1} - I_{X2}}{I_{X1} + I_{X2}} \times \frac{L}{2}$$

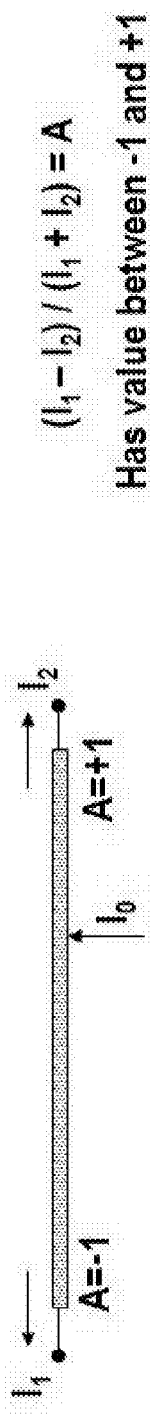

$(I_1 - I_2) / (I_1 + I_2) = A$

Has value between -1 and +1

Single PSD element:

$I_{o1} = G_{PSD} (I_1 - I_2)/(I_1 + I_2) = G_{PSD} A$

Linear array of 3 PSD elements:

Left: $I_{o3L} = G_{PSD} [A + (-2)]$

Center: $I_{o3C} = G_{PSD} [A + 0]$

Right: $I_{o3R} = G_{PSD} [A + 2]$

Linear array of 5 PSD elements:

Left, left: $I_{o5LL} = G_{PSD} [A + (-4)]$

Left: $I_{o5L} = G_{PSD} [A + (-2)]$

Center: $I_{o5C} = G_{PSD} [A + 0]$

Right: $I_{o5R} = G_{PSD} [A + 2]$

Right, right: $I_{o5RR} = G_{PSD} [A + 4]$

Linear array of N PSD elements:

Leftmost: $I_{oNL1} = G_{PSD} [A + (-N+1)]$

2nd Left: $I_{oNL2} = G_{PSD} [A + (-N+3)]$

Center: $I_{oNC} = G_{PSD} [A + 0]$

2nd Right: $I_{oNR2} = G_{PSD} [A + N-3]$

Rightmost: $I_{oNR1} = G_{PSD} [A + N-1]$

FIG. 11

OPTICAL ANGLE OF ARRIVAL SENSORS AND METHODS FOR DETERMINING AN ANGLE OF ARRIVAL OF INCIDENT LIGHT

BACKGROUND

The present disclosure relates in general to optical sensors, and more particularly to optical angle of arrival (AOA) sensors.

Conventional AOA sensors generally include an aperture that collects incident light, such as the light from a laser designator or laser illuminator that is back scattered from an object. The aperture projects an illuminated spot onto a 4-quadrant detector. The size of the illuminated spot is slightly larger than the size of one quadrant of the detector, so that at least two quadrants are illuminated. Each detector quadrant produces an output current. The values of the four output currents are then processed to determine the location of the center or the centroid of the illuminated spot and thus the angle of arrival of the incident light relative to the common axis of the aperture and detector.

Other sensors are known such as a dual-mode optical sensor that combines an AOA sensor (that is based on a silicon 4-quadrant detector) and a focal-plane-array (FPA) imaging detector. In one configuration of this sensor, the 4-quadrant detector is located between an optical imaging system (a set of lenses) and the focal plane array imaging detector. Thus, the light to be detected by the imager first passes through the silicon 4-quadrant detector. However, a 4-quadrant detector is most effective when the spot of light projected onto that detector is approximately equal to and slightly larger than the size of one of the quadrants. The centroid of the large spot illuminating the 4-quadrant detector is determined by comparing the relative amounts of optical energy detected by each of the four quadrants. Thus, any speckle in the optical illumination pattern at the lens or input aperture of this sensor and any occlusion of the input aperture produce a non-uniform optical intensity distribution across the projected spot and result in an erroneous estimate of the excursion of the corresponding centroid, and thus the angle of arrival of the light.

In some AOA sensors, instead of using a large defocused spot, the AOA sensor uses a small focused spot of light that is not affected or is minimally affected by speckle or by occlusions of the input aperture. For example, a lateral-effect position sensing detector (LEPSD) can sense the position of a small focused or nearly focused spot of light. However, in a conventional LEPSD, the maximum allowable excursion of the spot of light is limited by the size of the light-detecting area of that device. The LEPSD typically includes a set of two electrodes with one set of electrodes used to determine the x-location and the other set used to determine the y-location of the spot of light. The relative location of the incident spot of light with respect to the two electrodes of a set determines the relative amounts of the two currents that are output from those two electrodes.

Most two-axis LEPSD devices are fabricated with silicon detector material. Because silicon is an indirect-bandgap semiconductor material, the light-absorbing layer of a silicon photodetector must be very thick (typically 30-100 µm thick). Thus, the capacitance per unit area of silicon photodetectors is small. Because conventional LEPSD devices use silicon material, these devices are not sensitive to eye-safe laser wavelengths (wavelengths >1.4 µm). To sense the longer wavelengths, the LEPSD must be made from a direct-bandgap material such as InGaAs or InAs, InAsSb, InSb or HgCdTe. However, for example, the InGaAs LEPSD has a PIN diode structure with the two InP layers being the P-layer and the N-layer of the diode and the undoped or lightly doped InGaAs layer being the I-layer of the diode. Because the I-layer is so thin, with a typical thickness being 1-3 µm, the capacitance per unit area of an InGaAs LEPSD is quite high and can limit the response bandwidth and the rise time of a large-area device.

Some devices use multiple photodiode detectors that are configured to function like a single-axis LEPSD, wherein the collection of multiple photodiodes acts like the light-absorbing region of one LEPSD. The photodiodes are physically arranged in a linear array and are electrically connected to a linear chain of resistors, with a photodiode connected to each junction between two resistors. However, these devices can distinguish only as many distinct spatial locations for the incident light as the number of photodiodes in the chain. Thus, to achieve high resolution for an AOA sensor based on such a resistively combined array, a very large number of photodiodes is needed.

Some devices include two-dimensional arrays having elements that are LEPSDs rather than conventional photodiodes. For the arrays in these devices, the analog outputs from the multiple LEPSDs elements are provided on a shared set of output lines, but in a time-multiplexed manner, similar to the output for an imager array. Thus, the raster-scanned, time-multiplexed outputs for the multiple array elements are provided on a frame-by-frame basis. As a result, the response bandwidth of these arrays is limited to the frame rate, which generally is slower than 100 kHz. The slow response achieved by the frame-by-frame multiplexing allows these arrays to detect only the occurrences of pulses that are spaced far apart in time and cannot provide any information on the temporal shape of moderately narrow pulses of incident light. In some devices, each LEPSD is provided separately and the outputs for each LEPSD element are connected to separate analog-to-digital converters. The digital signals from the analog-to-digital converters are then processed together. Thus, these LEPSD arrays have the limitation that in order to achieve the large response bandwidth suitable for detecting and discerning short pulses or closely spaced pulses, the individual LEPSD elements must have outputs digitized separately.

Some known devices also include an array of LEPSD elements that is integrated with an image-detecting array to form a dual-band sensor that has approximately the same image plane for the wavelengths of light sensed by the AOA sensor and the wavelengths of light sensed by the image-detecting array. However, these dual-band sensors require a complicated achromatic optical imaging system to provide AOA operation. Unless complicated achromatic designs are used, the imaging system would define different focal-plane locations for the different wavelengths of light. Thus, conventional dual-band, dual-mode sensors that combine an AOA sensor and an image-detecting array and that use the same optical imaging system (e.g., lens) for both the AOA sensor and the image-detecting array either project a defocused spot of light onto the AOA sensor or require complicated achromatic designs for their optical imaging systems.

SUMMARY

In one embodiment, an angle-of-arrival (AOA) sensor is provided that includes a focusing lens and an array of lateral-effect position sensing detector (LEPSD) elements. The focusing lens is configured to focus light on the array, wherein each of the LEPSD elements includes an absorber region that absorbs light of a first wavelength range that is focused on the LEPSD elements. Each of the LEPSD elements further includes at least one lateral current conducting layer that has a relatively low sheet resistance.

In another embodiment, an optical sensor is provided that includes a focusing lens and a lateral-effect position sensing detector (LEPSD) array. The optical sensor also includes an image detecting array, wherein the focusing lens, LEPSD array and image detecting array are arranged in an in-line configuration. The focusing lens is configured to focus a spot of light on the LEPSD array and an image on the image detecting array, and the LEPSD array is separated from the image detecting array with the LEPSD array located closer to the focusing lens than the image detecting array.

BRIEF DESCRIPTION OF THE DRAWINGS

FIG. 11 is an illustration showing a determination of the distinct offset current value identifying each LEPSD element of an array in accordance with an embodiment.

DETAILED DESCRIPTION

Figure 1:
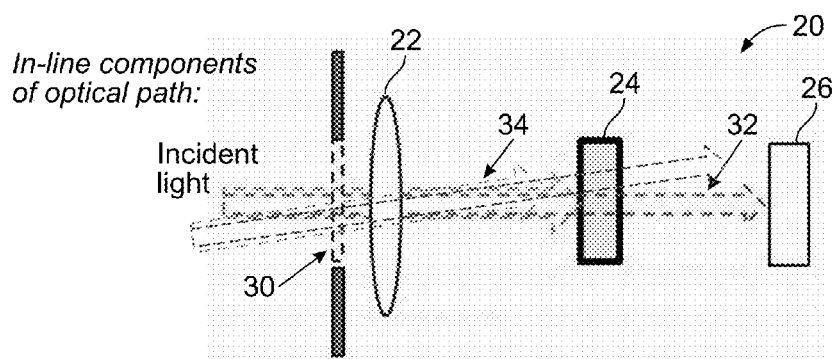
FIG. 1 is a schematic illustration of an optical sensor in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks (e.g., lens or amplifier) may be implemented in a single piece of hardware (e.g., a simple lens or a single amplifier stage or chip) or multiple pieces of hardware. Similarly, the software programs may be stand-alone programs, may be incorporated as subroutines in an operating system, may be implemented in a field-programmable gate array, and the like. It should be understood that the various embodiments are not limited to the arrangements and instrumentality shown in the drawings.

As used herein, the terms "system," "unit," or "module" may include any combination of hardware and/or software system that operates to perform one or more functions. For example, a system, unit, or module may include a computer processor, controller, or other logic-based device that performs operations based on instructions stored on a tangible and non-transitory computer readable storage medium, such as a computer memory. Alternatively, a system, unit, or module may include a hard-wired device that performs operations based on hard-wired logic of the device. The systems, modules, or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide systems and methods for optical detection, such as for an optical sensor (or optical seeker) to allow angle of arrival (AOA) detection and determination. For example, various embodiments provide an angle-of-arrival sensor that allows for detection of short pulses or flashes of light that are reflected from or emitted by an object (such as located a distance from the sensor).

Figure 2:
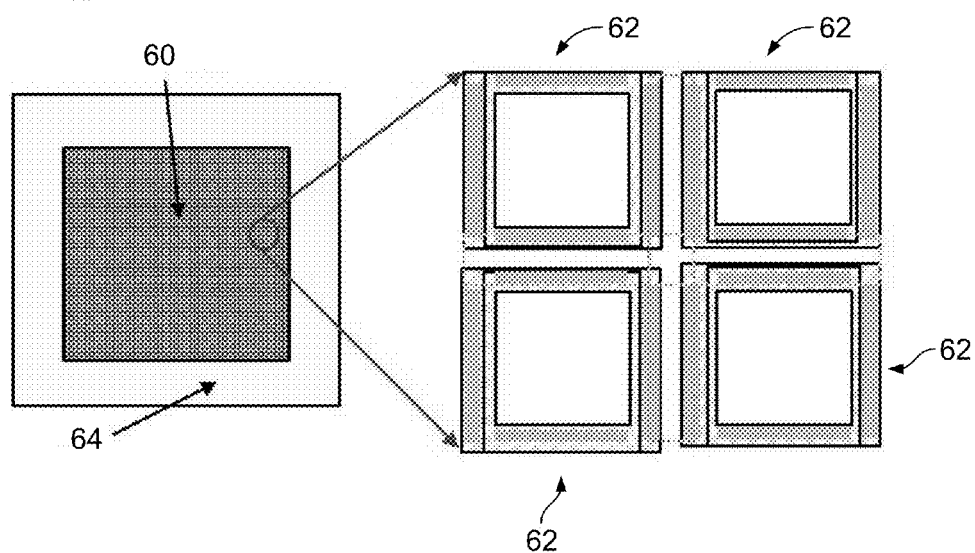
FIG. 2 is an illustration of an array of lateral-effect position sensing detector (LEPSD) elements in accordance with an embodiment.

In one embodiment, as illustrated in FIG. 1, an optical sensor 20 may be provided that can determine the AOA of incidence light. The optical sensor 20 includes a focusing lens 22 and an illuminated-spot locating detector 24 that includes an array 60 of closely spaced lateral-effect position sensing detector (LEPSD) elements 62 (shown in FIG. 2). In operation, the LEPSD elements 62 can determine the location of a small spot of light that illuminates a portion of the detecting area of the array 60. In one embodiment, each LEPSD element 62 of the array 60 has four electrical outputs that are coupled to four associated electronic preamplifiers and noise-bandwidth limiting filters as described herein. Additional electronic circuitry for each LEPSD element 62 determines the location of the spot of light illuminating that LEPSD element 62 and also supplies or generates an additional amount of electrical current or voltage (or equivalent signal) indicative of the particular location of that LEPSD element 62 in the array 60. In FIG. 2, the electronic preamplifier and noise-limiting circuitry and position determining circuits are generally identified by the reference numeral 64.

In one embodiment, a current-summing or voltage-summing amplifier or combining module (not shown) combines the output signals from the multiple LEPSD elements 62 to produce a set of output signals that represent the location, along one of two orthogonal axes, of the illuminated spot in terms of the overall area of the LEPSD array 60 or a subset of the LEPSD elements 62 of the LEPSD array 60. Thus, the electrical output signals from the LEPSD array or array subset resemble (or appear like) the outputs from an equivalent single LEPSD having a light-detecting area that is equivalent to the large overall area of the array or array subset. However, the response bandwidth of the LEPSD array 60 is determined by the larger bandwidth of a single, smaller-area LEPSD element 62 and the associated preamplifier circuit and filter for that LEPSD element 62. Thus, the optical sensor 20 of various embodiments includes noise-bandwidth limiting filters, the offset producing circuit for each array element 62 and the summing amplifier or combining module as will be described in more detail herein.

The optical sensor 20 can optionally include an image detecting array (which is a focal-plane-array (FPA) detector 26 in the illustrated embodiment of FIG. 1) and an associated readout integrated circuit, with both the illuminated-spot locating detector 24 and the FPA detector 26 sharing the same focusing lens 22 and optical axis 28. For example, incident light passes through a common optical aperture 30 along the optical axis 28 or at some angle-of-arrival relative to that optical axis 28.

In various embodiments, by using the focusing lens 22 or alternatively lenses that are dispersive, the focal plane for the light detected by the illuminated-spot locating detector 24 (defining the AOA sensor) is different from the focal plane for the light detected by the image detecting array, namely the FPA detector 26. In the illustrated embodiment, the illuminated-spot locating detector 24 is located at approximately its focal plane, between the lens 22 and the FPA detector 26. In one embodiment, the illuminated-spot locating detector 24 detects laser light of a first wavelength range (e.g., 1.06 µm-1.65 µm) and the FPA detector 26 detects light of a second, longer wavelength range (e.g., long-wave infrared LWIR, 8-12 µm, or mid-wave infrared MWIR, 3-5 µm). However, different wavelengths of light may be detected by the various components.

In various embodiments, the illuminated-spot locating detector 24 has high transparency (e.g., 20% or less absorption) for the LWIR and MWIR light. In one embodiment, the first wavelength range can include MWIR wavelengths and the second wavelength range can include LWIR wavelengths. In another embodiment, the first wavelength range can include SWIR wavelengths and the second wavelength range can include MWIR and LWIR wavelengths. Thus, in various embodiments, the illuminated-spot locating detector 24 can detect light of an eye-safe wavelength >1.4 µm. In some embodiments, the array 60 of LEPSD elements 62 are formed from a direct bandgap absorber material (e.g., InGaAs, InAsSb, InSb or HgCdTe).

Figure 3:
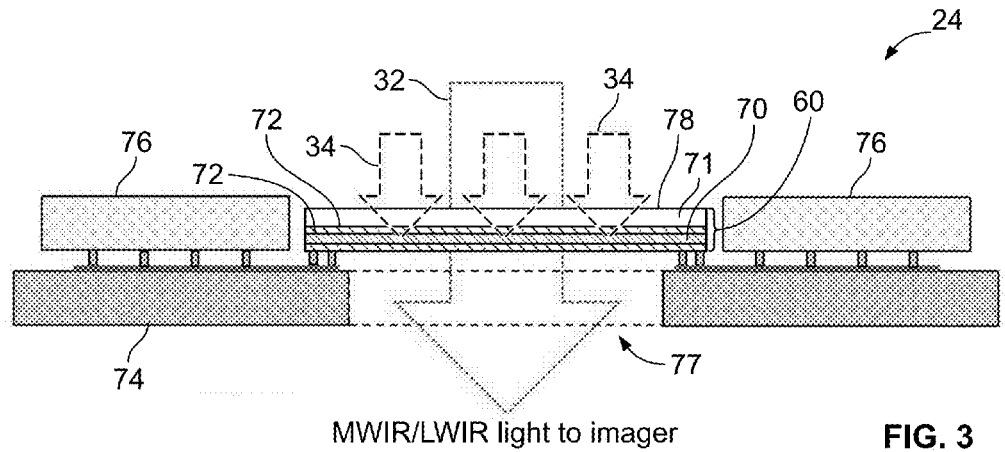
FIG. 3 is a schematic illustration of an assembly that includes an LEPSD array in accordance with an embodiment.

In various embodiments, as shown in FIG. 3, each LEPSD 62 of the array 60 includes an absorber region 70 (e.g., LEPSD array substrate) that absorbs the light of the first wavelength range (e.g., greater than 90%), but that has minimal absorption of the light of the second wavelength range. For example, the absorber region 70 in some embodiments is configured to have a high transparency to light (e.g., 20% or less absorption) for the second wavelength range, for example, such that all or substantially all of the light 32 (e.g., MWIR/LWIR light) passes through the ISLD 26 to the FPA imaging detector 28 (e.g., 20% or less absorption) as shown also in FIG. 1, while all or substantially all of the light 34 (e.g., laser light) of the first wavelength range is absorbed and detected by the ISLD 26 (e.g., greater than 90%).

The LEPSD elements 62 also include an optional substrate 71 and at least one lateral current conducting layer 72 (two lateral conducting layers 72 are illustrated) that have minimal absorption (e.g., 20% or less absorption) of the light of both the first wavelength range and the second wavelength range. These one or more lateral current conducting layers 72 have low sheet resistance. For example, in some embodiments, the sheet resistance of each of the layers is lower than 100Ω, which in one embodiment is lower than 500Ω and in another embodiment is lower 125Ω. In some embodiments, the absorber region 70 is sandwiched or positioned between two lateral current conducting layers 72, forming a three-layer structure. In some embodiments, the absorber region 70 is near or abuts a first surface of the substrate 71. In some embodiments, a wavelength-selective anti-reflective film 78 is formed on a second surface of the substrate 70 that is opposite the first surface.

Figure 4:
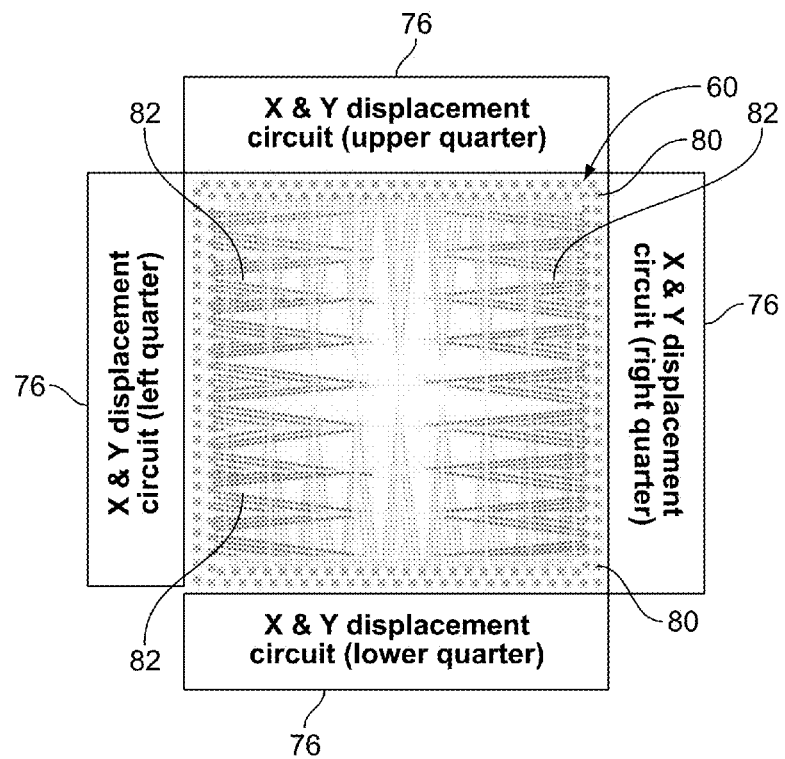
FIG. 4 is an illustration of an assembly that includes an LEPSD array in accordance with an embodiment.

The LEPSD array 60 has electrical contact pads 80 (as shown in FIG. 4) located at the periphery of the array piece. The electrical interconnect lines 82 between the array elements 62 and the contact pads 80 in various embodiments have sub-wavelength width for passage of the light of the second wavelength range and the interconnect lines are arranged in a way that increases or maximizes the transmission of light of the second wavelength range through the LEPSD array 60. As illustrated in FIG. 4, the density of the interconnect lines 82 (shown in a triangular type of pattern) may be greatest near the edges of the array 60 and the ISLD 26 has greater transparency in a central portion. Thus, the center of the FOV of the imager has the best sensitivity.

Moreover, electronic circuits 76 (illustrated in this embodiment as X and Y displacement interface circuits to determine the location of a detected light spot as described herein) associated with the sensor are located beyond the outer edges of the LEPSD array 60. The electronic circuits 76 can, for example, surround all four sides of the LEPSD array 60. It should be noted that the ISLD 24 is located closer to the optical imaging system (e.g., lens 22) than the FPA detector 26.

Referring again to FIG. 3, the LEPSD array 60 is mounted on an electrical-interconnect base 74 (also referred to as the interconnect base 74) that has an opening 77 formed in the central portion, with the LEPSD array 60 mounted over the central portion. The electronic circuits 76, which in various embodiments include one or more of the preamplifiers and spot-location determining circuits, as well as a summing amplifier are mounted on the electrical-interconnect base 74 a distance from the central portion. The interconnect base 74 contains electrical interconnect paths 79 between the LEPSD array 60 and the electronic preamplifiers in some embodiments. In some embodiments, the light to be detected by the imager is projected by the optical imaging system (e.g., focusing lens 22) to pass through the LEPSD array 60, through the opening 77 in the interconnect base 74, and onto the image detecting array, such as the FPA detector (shown in FIG. 1).

It should be noted that the illuminated-spot locating detector 24 in various embodiments is formed from low-resistance lateral current conducting layers 72 of the LEPSD elements 62, with the lateral current conducting layers having an optical transparency as described herein. Also, the positioning and arrangement of the components, for example, the width and arrangement of the electrical interconnect lines on the LEPSD array 60, the placement of the wavelength-selective anti-reflective film 78, the interconnect base 74 that has a central opening, and the relative positions of the LEPSD array 60 and electronic circuits 76 on the interconnect base 74 facilitate the operation of various embodiments as described in more detail herein.

Figure 13:
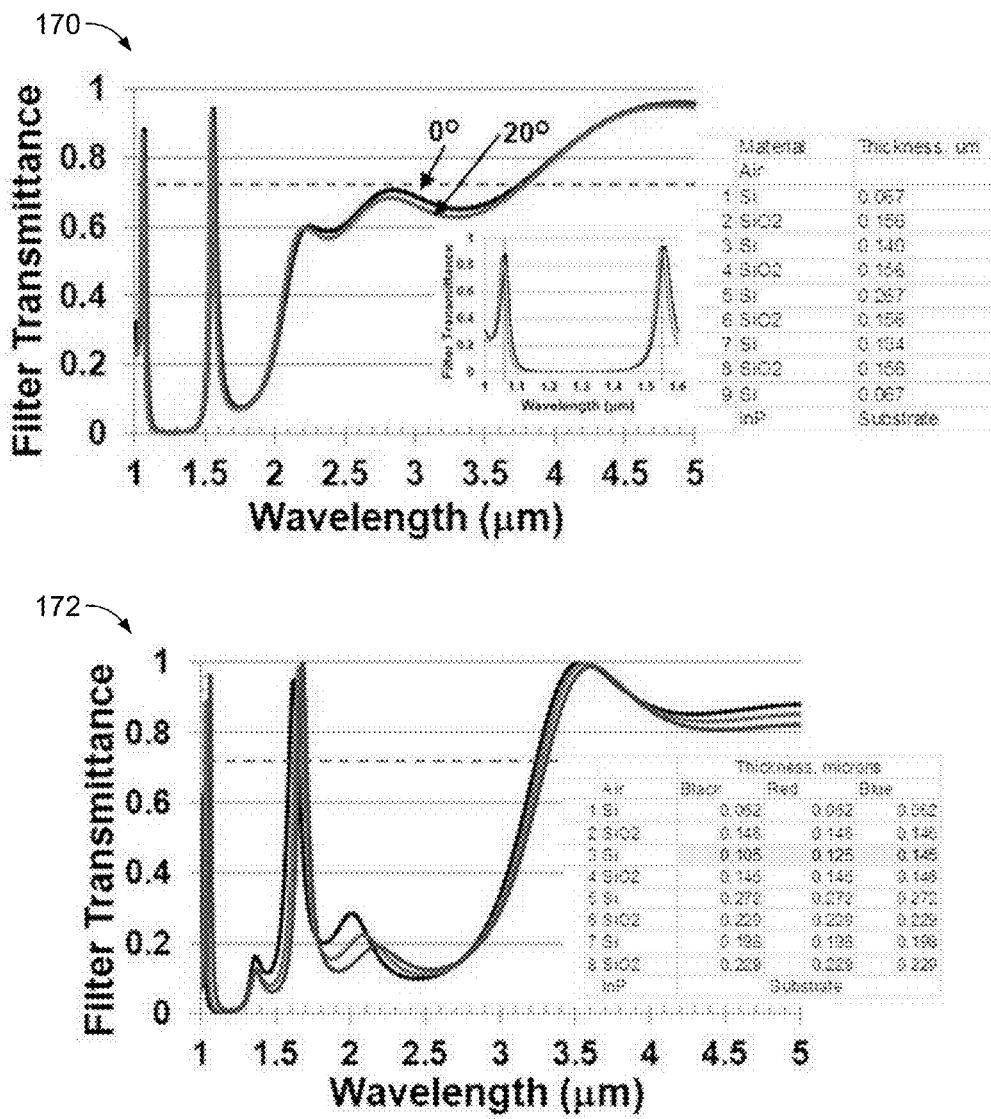
FIG. 13 are graphs illustrating properties of multi-layer wavelength selective coatings in accordance with an embodiment.

The wavelength-selective anti-reflective film 78 couples certain wavelengths of light to the absorber region 70. The wavelength-selective anti-reflective film 78 can be a wavelength selective coating. Two examples of multi-layer coatings (comprising alternating thin layers of silicon and silicon dioxide) are shown in FIG. 13 having the properties illustrated by the graphs 170 and 172 and are designed to selectively transmit light of 1.06 µm wavelength, light of a wavelength between 1.5 µm and 1.65 µm, and MWIR light. The coating could also transmit LWIR light. Such a wavelength selective coating is desirable for reducing the background illumination of the LEPSD array 60. For example, the background light may comprise visible wavelengths and near infrared wavelengths (associated with reflected sunlight) and can be much more intense than the laser light to be detected by the LEPSD array 60.

Referring again to FIG. 2, the array 60 of LEPSD elements 62 includes elements that have a square shape. However, other shapes are contemplated and may be used. For example, the detector array 60 and LEPSD elements 62 may have an outline or contour of other shapes such as a circle, ellipse or rectangle. It should be noted that although an array of dual-axis LEPSD elements 62 is illustrated, variations are contemplated, such as quadri-lateral LEPSD elements. A quadri-lateral LEPSD element would have only one lateral current conducting layer 92 instead of two such layers. Referring again to FIG. 3, the lateral current conducting layer 72 of a quadri-lateral LEPSD element could be located between the absorber region 70 and the substrate 71 or on the opposite of the absorber region from the substrate. It also should be noted that if the lateral current conducting layer 72 is located only on the side of the absorber region 70 opposite the side from which the laser light 34 is incident, that lateral current conducting layer would not need to be transparent to the light of the first wavelength range.

Figure 5:
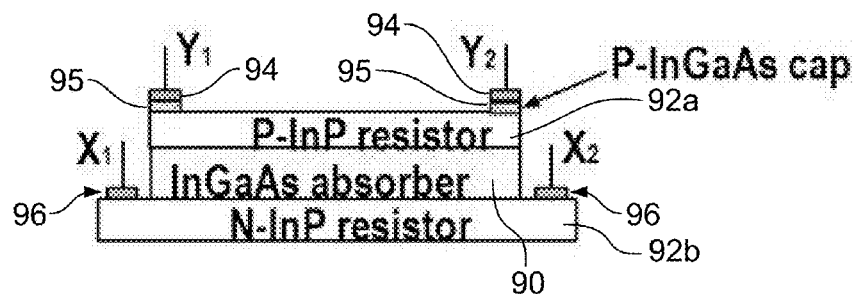
FIG. 5 is another illustration of an LEPSD element in accordance with an embodiment showing multiple layers.

Referring to FIG. 5, the dual-axis LEPSD elements 62 in various embodiments includes an InGaAs absorber layer 90 (which may be embodied as the absorber region 70 shown in FIG. 3) that is sandwiched between two InP lateral current conducting layers 92a and 92b (which may be the conducting layers 72 shown in FIG. 3). In various embodiments, the absorber layer 90 has very low residual free carrier concentration and may be undoped, un-intentionally doped or lightly doped, such that it can become depleted of electronic free carriers when a low valued bias voltage is applied. In one embodiment, one of the InP layers 92a is doped p-type (illustrated as the top layer in FIG. 5) and the other InP layer 92b is doped n-type (illustrated as the bottom layer in FIG. 5). The resulting structure forms a PIN photodiode. It should be noted that the dual-axis LEPSD elements 62 do not include an InP substrate 70 in some embodiments. In another embodiment, the p-doped InP layer 92a is replaced by a hole-canceling semi-insulating InP layer (such as achieved by doping with Fe), located adjacent the InGaAs layer, and an n-doped InP layer.

For the dual-axis LEPSD elements 62, in various embodiments, a pair of electrical contacts 94 is made to the p-InP layer 92a and another pair of electrical contacts 96 is made to the n-InP layer 92b. The contacts 94 or 96 of a pair are located along opposite edges of the LEPSD element 62. In one embodiment, all four contacts 94 and 96 are formed on the top side of the layers, which is opposite the substrate (typically InP) upon which the InGaAs, p-InP and n-InP layers 90, 92a, and 92b are grown. It should be noted that that optional regions 95 of p-doped InGaAs may be provided and located between the two contacts 94 formed above the p-InP layer 92a and that p-InP layer 92b. The heavily p-doped InGaAs regions facilitate the formation of low-resistance ohmic contacts. As an example of a variation, for a quadrilateral LEPSD, four electrical contacts are made to the InP layer 92a located near the top side of the structure. The four contacts may be located, for example, at the four corners of the square shaped structure, but the contacts also may be located along the sides of that structure. A reference or common contact is made to the InP layer 92b on the other side of the InGaAs absorber layer 96.

Figure 6:
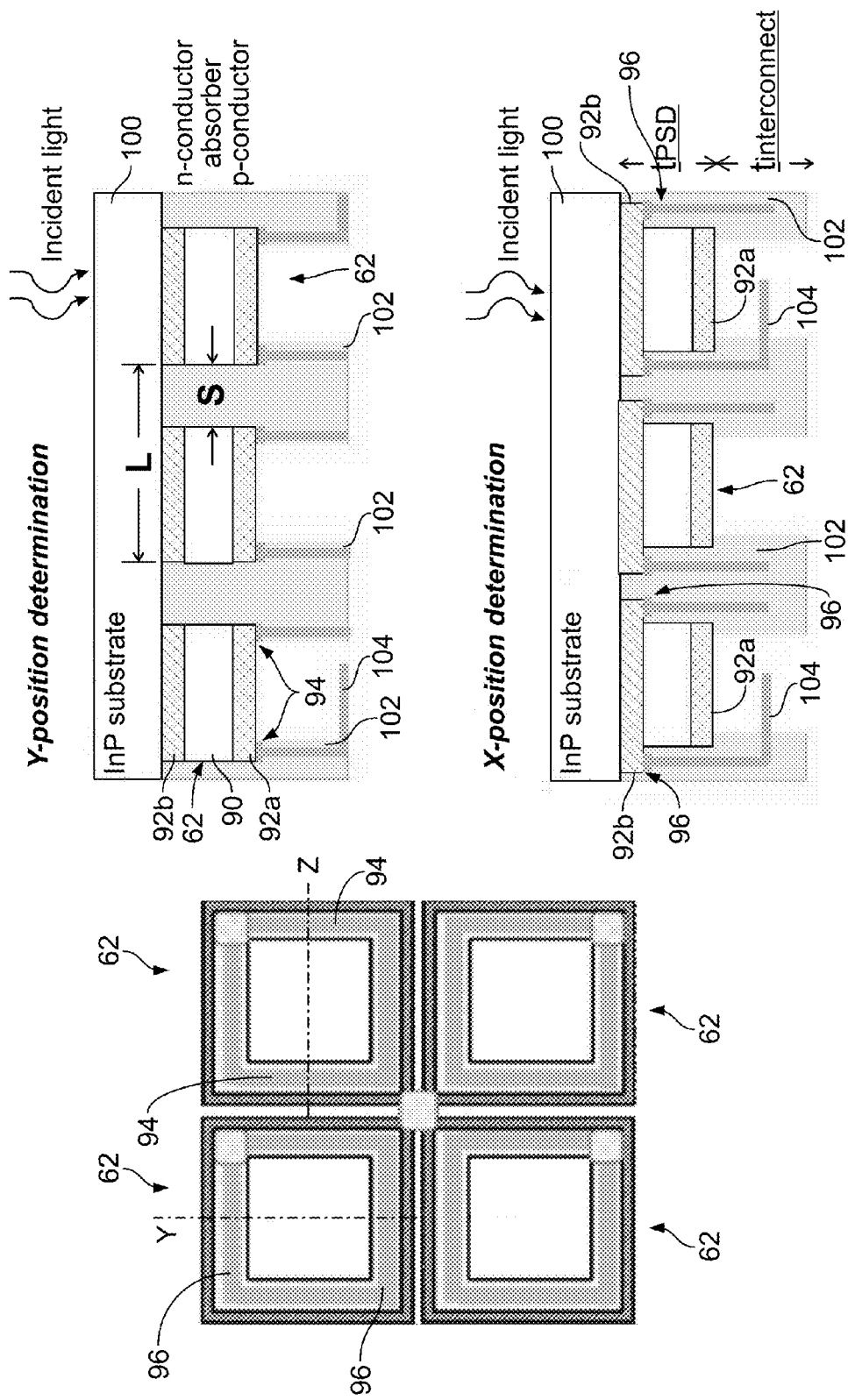
FIG. 6 is an illustration of LEPSD elements in accordance with an embodiment.

FIG. 6 illustrates in cross section several array elements 62. To provide electrical isolation between the LEPSD elements 62, the elements 62 can be fabricated on a semi-insulating substrate 100. Each LEPSD element 62 has a mesa that is etched down to the semi-insulating substrate 100. With reference also now to FIG. 5, another etching step removes a portion of the p-InP layer 92a and the InGaAs absorber layer 90 to expose the n-InP layer 92b so that the electrical contacts 96 can be made to that n-InP layer 92b. When dry etching processes are used for that etching and accurate lithography and metal deposition processes are used to form the metal contacts and interconnecting posts, it is possible for the gap S between adjacent light detecting regions of adjacent LEPSD elements 62 in various embodiments to be smaller than 10 µm and as small as 4-5 µm in some embodiments. The spot of light projected onto the LEPSD array 60 in various embodiments is larger than the size of this gap S. Such a constraint ensures that some light will be detected by at least one LEPSD element 62 of the array 60 regardless of the location of the spot on the array 60. Additionally, in some embodiments, the light is focused as a small spot, such as smaller than the desired finest spatial resolution of the LEPSD array sensor 60 (e.g., <60 µm and smaller than the size of an LEPSD element 62).

In one mode of operation, focused or nearly focused light collected by the optical aperture 30 is projected via the lens 22 (both shown in FIG. 1) onto the LEPSD array 60. The LEPSD elements 62 in various embodiments are placed as close to each other as possible and practically feasible. The spacing between adjacent elements 62 generally is limited by fabrication related constraints in various embodiments. In order to maintain continuous sensing of a moving spot of the projected light that traverses multiple adjacent LEPSD elements 62, as the angle-of-arrival varies continuously, the spacing S between adjacent elements 62 should be smaller than the diameter of that spot of light.

In various embodiments, the light illuminating the LEPSD array 60 is incident from the substrate side of the array 60, as illustrated in FIG. 6. The LEPSD array 60 includes one or more sets of electrical input/output (I/O) pads formed on the side of the array opposite the substrate 100 (i.e., the bottom side of the array as depicted in FIG. 6). As depicted in FIG. 4, the I/O pads 80 are located at the periphery of the LEPSD array piece, such as just beyond the periphery of the array 60 occupied by the LEPSD elements 62. The I/O pads are used to make electrical interconnections between the LEPSD elements 62 and the electronic circuits of the AOA sensor.

The LEPSD array piece also has metal posts 102 and metal interconnect lines 104 that provide electrical connections between the contacts formed on each LEPSD element 62 and the I/O pads. It should be noted that FIG. 4 shows one arrangement of the metal-interconnect lines. In various embodiments, the width and thickness of an interconnect line 82 is much smaller than the wavelength of the longer-wavelength light to be detected by the image detecting array that could be used together with the AOA sensor. Since the metal would block and absorb the longer wavelength light to be detected by the imaging array, the sub-wavelength width of the interconnect lines increases the transparency of the LEPSD array 60 for the longer wavelength light. In various embodiments, the metal I/O pads of the LEPSD array 60 are located beyond the field of view of the imaging array.

The LEPSD elements 62 in some embodiments have p-InP and n-InP lateral current conducting layers 92a and 92b with low sheet resistance. The p-doping level and thickness of the p-InP layer 92a and the n-doping level and thickness of the n-InP layer 92b are sufficiently high in various embodiments such that the sheet resistance of the two layers 92a and 92b is much less than 1000Ω and in some embodiments less than 500Ω or 125Ω. However, other resistance values are contemplated. This use of low resistance lateral current conducting layers 92a and 92b is contrary to the conventional LEPSD devices as described herein. For example, the sheet resistance of conventional LEPSD devices generally is larger than several kΩ and can be as large as 100 kΩ.

Figure 7:
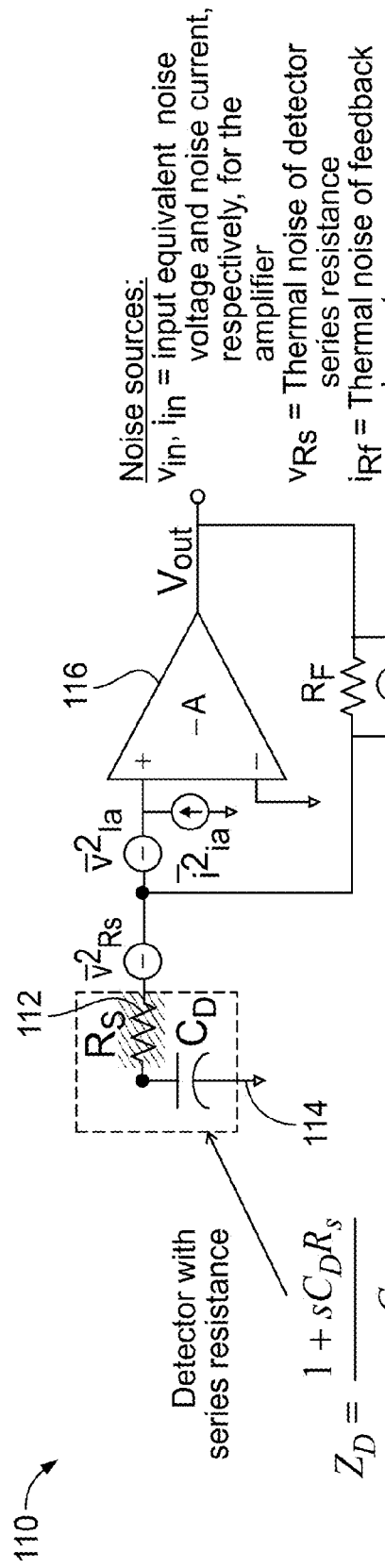
FIG. 7 is an illustration of a noise equivalent circuit for the effect of LEPSD capacitance and series resistance on noise.

It has been a general understanding that high inter-electrode resistance (i.e., the resistance between the two contacts made to the same lateral current conducting layer) is desirable for reducing the noise of a LEPSD. However, this understanding assumes that the desired response bandwidth of the sensor containing the LEPSD is limited by the LEPSD device. FIG. 7 illustrates the noise equivalent circuit 110 of a LEPSD 62, modeled as a series resistance $R_S$ 112 and a parallel capacitance $C_D$ 114, that is coupled to an electronic trans-impedance amplifier (TIA) circuit 116. The equivalent noise current referred to the circuit location of the LEPSD photo-detector (PD), as observed at one of the four contacts, has major contributions associated with the PD, with the equivalent input noise-voltage source of the input amplification stage of the TIA 116 and with the feedback resistance of the TIA 116. It should be noted that the noise associated with the series resistance of the PD (which is determined by the sheet resistances of the two lateral current conducting layers of the LEPSD) is divided by the square of the equivalent impedance $Z_o$ of that PD. The noise current is integrated over the desired response bandwidth of the AOA sensor. By greatly reducing the series resistance of the PD, the bandwidth of the PD can be made much larger than the desired bandwidth of the AOA sensor. A low-pass electrical filter can then be used after (or as part of) the TIA 116 to bandwidth-limit the noise contributed by the PD and TIA. From the expression shown in FIG. 7, when the cutoff frequency of the filter is far below the $R_S C_D$ limited cutoff frequency associated with the PD, the contribution of the PD to the input-referred noise current is proportional to $(4kTR_S)^{1/2}$. Thus, for a given value of the detector capacitance, the noise can be reduced by reducing the series resistance of the PD.

Figure 8:
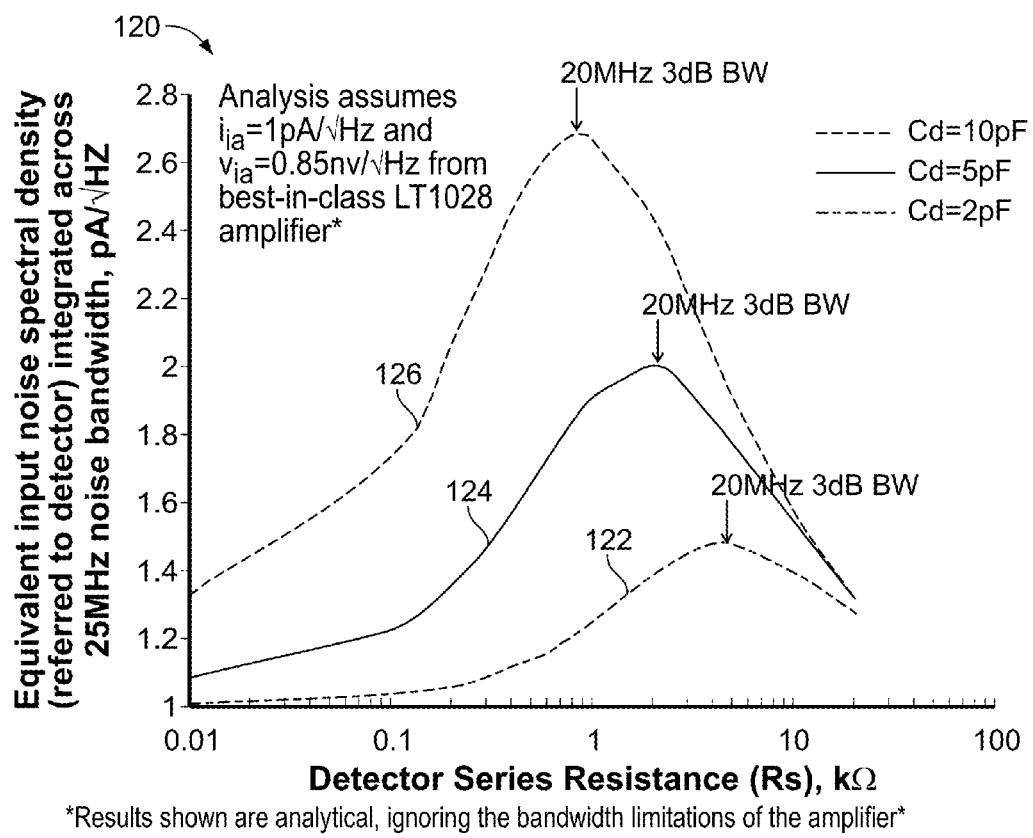
FIG. 8 is a graph of equivalent input noise spectral density.

FIG. 8 is a graph 120 that plots the calculated equivalent input noise spectral density of a PD connected to a TIA 116 through a contact 94, 96. The calculation was made for three different values of the parallel capacitance $C_D$ of the PD corresponding to the curves 122, 124, and 126, wherein the x-axis corresponds to the detector series resistance $R_S$ and the y-axis corresponds to the equivalent input noise spectral density. The plotted data shows that low noise can be achieved either at low values of the PD series resistance or at high values of that series resistance. Low noise performance can be achieved when the PD series resistance is several kΩ or higher, as previously understood. However, the data in FIG. 8 also shows that even lower noise can be achieved when the PD series resistance is lower than 1000Ω (for a PD with sufficiently low capacitance) and lower than 100-500Ω for a PD that has somewhat higher capacitance.

Figure 9:
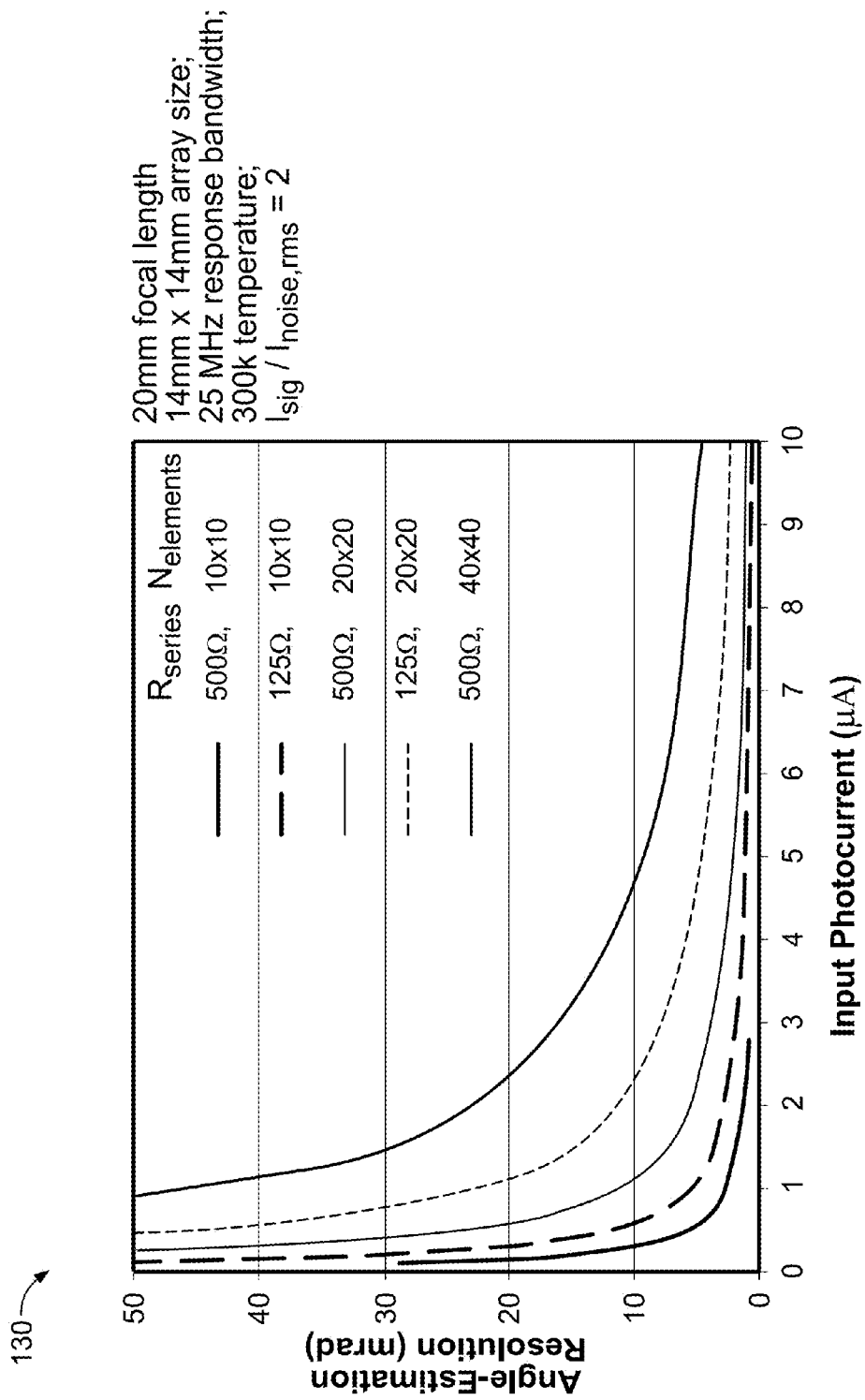
FIG. 9 is a graph of angle-estimation resolution.

In various embodiments, when the LEPSD array 60 is used in an AOA sensor, the angle-estimation resolution of that sensor is limited by the noise of the LEPSD array 60 and the associated TIA circuits. That noise depends on the series resistance of the LEPSD elements 62 and on the effective parallel capacitance of the LEPSD elements 62. The capacitance is determined by the size (and thus the area) of the LEPSD element 62. If it is assumed that the LEPSD array 60 has a fixed overall size (e.g., 14 mm×14 mm), the capacitance of a LEPSD element 62 depends on the number of elements per side in the array 60. FIG. 9 is a graph 130 that plots the dependence of that angle-estimation resolution (corresponding to the y-axis) on the amount of photocurrent (corresponding to the x-axis) generated in the LEPSD element 62 by the spot of light illuminating that LEPSD element 62. As can be seen, the angle-estimation resolution is improved when the photocurrent is higher, since the signal-to-noise ratio for the AOA sensor input stages is increased. Furthermore, the resolution of the AOA estimation is improved by reducing the series resistance and also by having more, but smaller LEPSD elements 62 in the array 60 (for reduced parallel capacitance).

The LEPSD array 60 in various embodiments has a large overall detecting area that provides a large instantaneous field of view (FOV) when combined with the focusing lens 22. Since the output currents generated by each LEPSD element 62 of the array 60 are coupled to individual electronic preamplifiers that are separate from the electronic preamplifiers of the other array elements 62, the response bandwidth of the LEPSD array 60 is limited by the smaller area and capacitance of a single LEPSD element 62 rather than by the large overall area of the array 60. As a result, the optical sensor 20 in various embodiments has a large FOV as well as fast response (large response bandwidth).

Unlike conventional LEPSDs, the LEPSD elements 62 of the array 60 have lateral current conducting layer or layers 72 with intentionally low sheet resistance. For example, in various embodiments, the LEPSD elements 62 have lateral current conducting layers having sheet resistance that is smaller than 500Ω. This low sheet resistance enables a LEPSD element 62 to have a larger area and thus larger parallel capacitance and still achieve the desired large response bandwidth as well as low noise. Thus, the desired large FOV for the AOA sensor can be achieved with an array that has fewer sets of LEPSD elements 62, preamplifier circuits and illuminated-spot location determining circuits 26. The low noise is achieved because the frequency response of the LEPSD element in combination with a low-noise preamplifier circuit and noise-bandwidth limiting filter has a high-frequency cutoff that suppresses much of the noise, whose noise-spectral density increases with frequency.

In contrast, conventional LEPSD devices have lateral current conducting layers having a sheet resistance that is intentionally high (generally greater than 5 kΩ and in many instances greater than 10 kΩ). The sheet resistance of the lateral current conducting layers is made high in conventional LEPSD devices to provide high inter-electrode resistance in order to achieve improved sensitivity and lower noise. For example, typical values for the inter-electrode resistance of some dual-axis LEPSD devices range between 10 kΩ and 100 kΩ. This inter-electrode resistance is indicative of the sheet resistance of the lateral current conducting layers of those devices. The conventional LEPSD devices are not used together with a noise-bandwidth limiting filter whose high-frequency cutoff is designed to suppress the noise. Instead, for conventional LEPSD device, the noise is reduced by intentionally increasing the inter-electrode resistance.

The optical sensor 20 configured as a dual-mode optical sensor (including the AOA sensor and the image-detecting array) can be used for guiding a steerable projectile, with the sensor 20 typically being located at the nose or tip of that projectile. The shared lens, common optical axis configuration of the AOA sensor and the image detecting array enables the dual-mode sensor 20 to have a smaller diameter and to make more efficient use of the available area at the nose of the projectile for an aperture 30 that captures the light to be imaged and the laser light having an incidence angle relative to the position of the projectile that is to be determined. Additionally, because the AOA sensor and the image detecting array can have a large FOV, the dual-mode sensor can be mounted in a body-fixed configuration in a vehicle rather than having to be mounted in a bulky mechanical gimbal that then points the sensor in various desired directions.

In contrast, conventional dual-mode optical sensors have a silicon 4-quadrant detector as the AOA sensor made to be illuminated with a large (>>1 mm size and >5-10 mm if a large FOV is desired) and preferably diffused spot of light. Thus, those dual-mode sensors either need to use an optical wavelength-selective (dichroic) beam splitter that separates the paths for the light of the first and second wavelength ranges or need to use separate apertures for the imager and for the AOA sensor. The result of this splitting of the light paths or use of separate apertures is that the diameter of the dual-mode optical sensor is increased (with that diameter generally being greater than 4 inches and sometimes being greater than even 6 inches). The optical sensor 20, however, can fit within the pointed-nose shape of many projectiles (whose diameter at the tip of its nose can be smaller than an inch) and within the small-diameter (<4 inch diameter) shape of other projectiles. Thus, the optical sensor 20 can be incorporated in many projectiles with minimal or no change to the outer shape or outline of that projectile. For example, the optical sensor 20 can provide an imaging-seeker guided product with an upgraded capability of semi-active laser (SAL) designated guidance or SAL designated initial identification of targets. Also, the optical sensor 20 can provide a SAL-seeker guided product with an imaging capability that can be used for terminal guidance. Additionally, the optical sensor 20 can detect light of eye-safe wavelengths (e.g., >1.4 μm), as well as the 1.06 μm wavelength emitted by many laser designators.

As illustrated in FIG. 9, the optical sensor 20 in accordance with various embodiments has an angle-determining resolution that improves as the intensity of the focused spot of light illuminating that sensor increases, and thus the input photo-current produced by the illuminated LEPSD element increases. In many cases, the intensity of the laser light coupled into the aperture 30 of the optical sensor 20 increases as the sensor becomes closer to a laser-designated target. Thus, the precision of the SAL-designated guidance can be improved as the projectile moves closer and closer to that target. Additionally, the combination of the AOA sensor (e.g., illuminated-spot locating detector 24) with the image-detecting array (e.g., FPA detector 26) enables the resulting dual-mode sensor to both produce an infrared image of a scene and to associate with one or more specific locations on that image a temporal waveform having pulse locations (in time) that indicate the range (e.g., distance away from the sensor) of an object at that location or indicates a code of a laser-signal transmitter.

Figure 10:
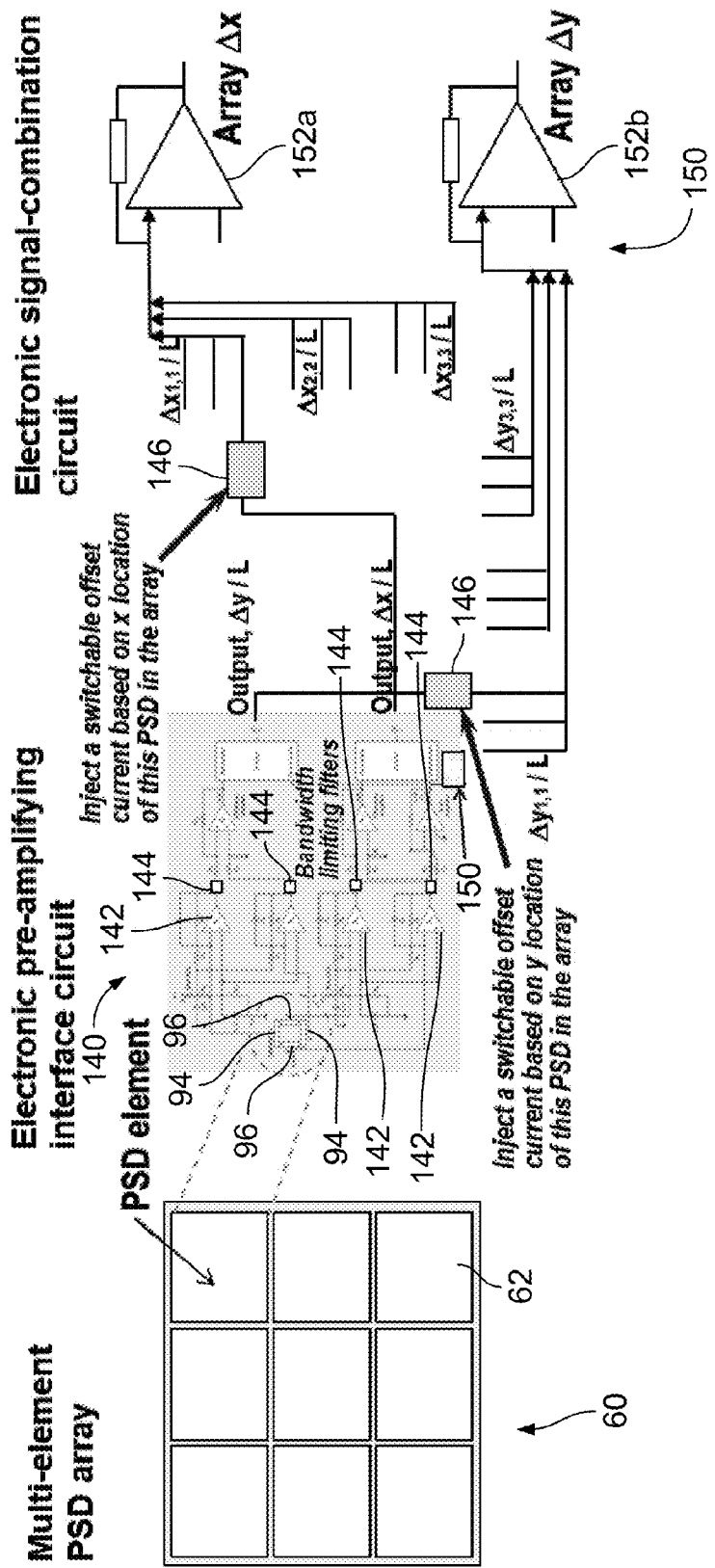
FIG. 10 is a schematic illustration of illuminated-spot locating detector (ISLD) in accordance with an embodiment.

In one embodiment, a position-determining interface circuit 140 as shown in FIG. 10 is provided. In the position-determining interface circuit 140 each LEPSD element 62 of the array 60 is connected to four TIA circuits 142, with each of the four contacts (94 and 96 as also depicted in FIG. 6) connected to a different TIA circuit 142. The output of each TIA circuit 142 in the illustrated embodiment is coupled to a filter 144 that band-limits the noise. FIG. 10 also illustrates one configuration to combine the outputs from the multiple signal channels, with a signal channel associated with each array element 62. In particular, each signal channel has two outputs. One output provides the displacement of the illuminated spot along the x-axis for its associated LEPSD and the other output provides the displacement of that illuminated spot along the y-axis. The outputs may be generated using difference and sum amplifiers as described herein.

As depicted in FIG. 10, the two output signals from each LEPSD channel of the array and corresponding interface electronics, which indicate the X and Y displacements of the illuminating spot from the center of that LEPSD element 62, are coupled to a pair of circuits 146 that inject a predetermined offset current to each output signal. The offset current is indicative of the relative location of the LEPSD element 62 for that channel in the overall array 60.

FIG. 11 shows some illustrative examples of how the offset value is determined, such as for a linear array of 3 elements, 5 elements, and N elements. For example, for each LEPSD element 62, it is assumed that the output from the position-determining interface circuit 140 of that element 62 is a current or voltage A having a value that can vary between $-G_{PSD}$ and $+G_{PSD}$. Thus, the total variation in that output current or voltage is $2 \times G_{PSD}$. For an array of N elements on a side, with N being an odd number, the element at the center of that array will have an offset value of 0. The element 62 at the left end of that array will have an offset value of $-G_{PSD}(N-1)$. The next element 62 from the left end will have an offset value of $-G_{PSD}(N-3)$, and so on. The element 62 at the right end of that array will have an offset value of $+G_{PSD}(N-1)$. The next element 62 from the right end will have an offset value of $+G_{PSD}(N-3)$, and so on.

The position-determining interface circuit 140 for each LEPSD element 62 also has a threshold detect circuit 150 that determines whether the total photo-current generated in the element 62 exceeds a threshold value (e.g., predetermined value). The threshold detect circuit 150 can be used to eliminate false detections of an input pulse due to noise of the LEPSD element 62 or the corresponding TIA circuits 142. The threshold detect circuit 150 also can be used to compensate for slowly varying background light, so that only the short pulse or flashes of light received from an object is considered. With reference to FIG. 10, the output of the threshold detect circuit 150 is coupled to the offset-current generating circuit 146 and is used to gate or switch-on the offset current. The threshold detect circuit 150 also may be used to gate the output current from the position-determining interface circuit 140. Thus, in operation, when the light illuminating a LEPSD element 62 is sufficiently strong (to exceed the threshold set-point), the corresponding interface circuit produces an output current having an amplitude (either positive or negative) that is indicative of the location of the focused spot of that light upon the LEPSD element 62 and also indicative of the location of that LEPSD element 62 in the array 60.

The output currents or voltages from the multiple position-determining interface circuits 140 (with one circuit for each LEPSD element 62 of the array 60), are summed together by an electronic signal-combination circuit 150 that includes a pair of electronic summing amplifiers 152, wherein one of the summing amplifiers 152a is associated with the X displacement and the other summing amplifier 152b is associated with the Y displacement (for example, current summing amplifiers 152a and 152b are depicted in FIG. 10). The summing amplifiers 152 produce a pair of outputs for the LEPSD array 60 that are similar to the outputs of an equivalent single large-area LEPSD. The X and Y displacement values thereby obtained for a spot of light projected onto the LEPSD array 60 are indicative of the angle of arrival of the pulse of light that is collected by the aperture 30 (shown in FIG. 1) and is then focused and projected by the lens 22 (shown in FIG. 1) into the spot illuminating the LEPSD array 60. If there are several pulses of light that are incident from different directions onto the aperture 30, the output waveforms of the two summing amplifiers 152 have pulses with amplitudes that are different corresponding to the different angular directions of the pulses of incident light.

Figure 12:
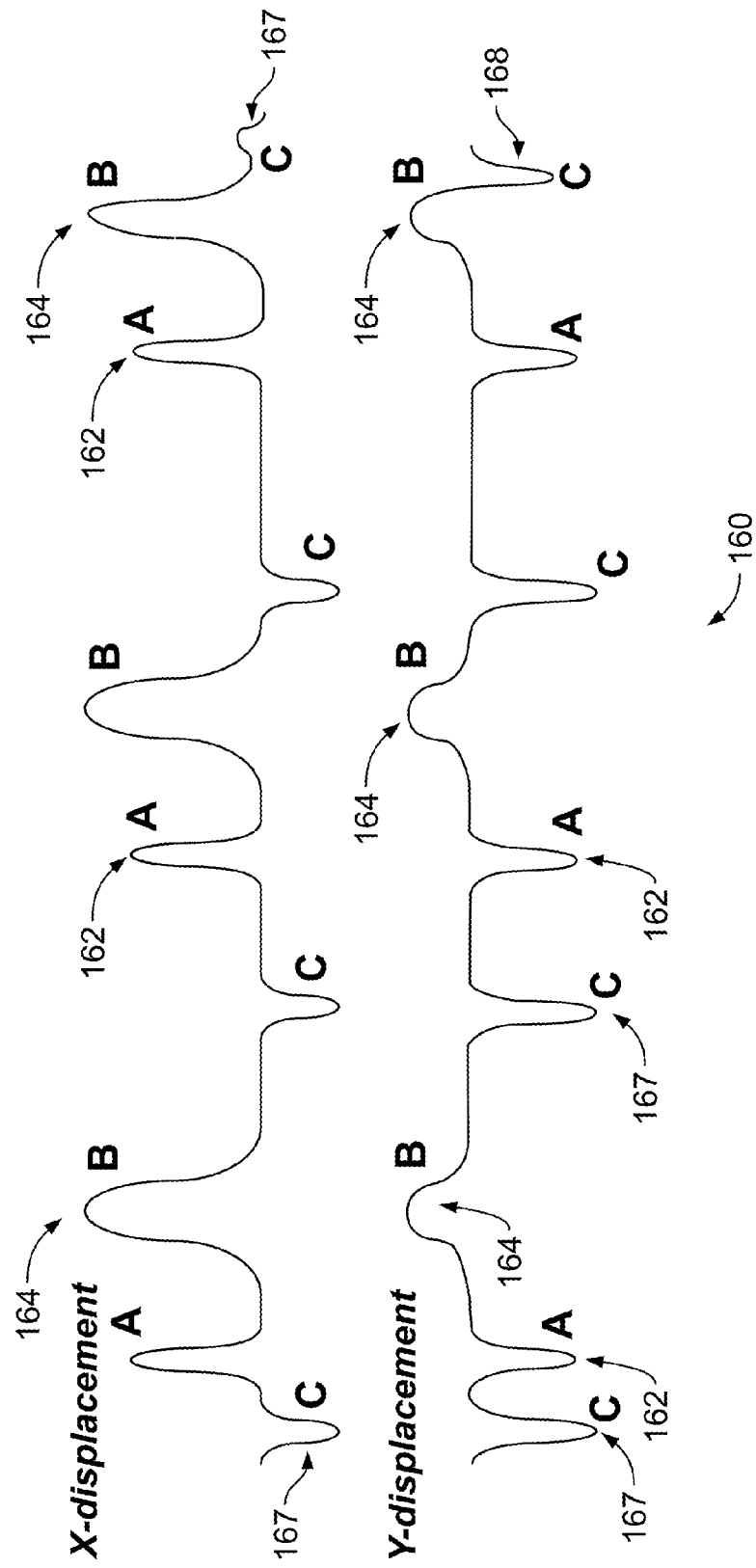
FIG. 12 is an illustration of waveforms produced in accordance with an embodiment.

FIG. 12 is a drawing 160 that illustrates an exemplary case in which light from one pulsed laser source is reflected from two different objects onto the aperture of the optical sensor 20, with one object having a broadened reflected pulse. For this exemplary case, light from a second pulsed laser source (which has a different pulse repetition rate) is reflected from yet another object onto the aperture of the optical sensor 20. Thus, there are three different incidence angles for the pulses of light that are collected by the optical sensor 20 (corresponding to the pulses 162 (pulse A), 164 (pulse B), and 166 (pulse C)). Because the optical sensor 20 has sufficiently fast (and large bandwidth) response, the analog outputs of the optical sensor 20 (as illustrated by the waveforms 167 and 168 (showing x-displacement and y-displacement waveforms) can indicate a width of a pulse and also can indicate a situation when two pulses overlap in time. As can be seen, the waveforms 167 and 168 are continuous waveforms (resulting from the detection of pulses of light projected onto the LEPSD elements 62 in the array 60) instead of outputs provided on a frame by frame basis. For example, the amplitude of the signal waveforms 167 and 168 may be used to determine the location of the spot of light on the LEPSD elements 62 in the array 60.

In the illustrated embodiment, for example, the pulses 162 may be used to detect the location of a target, whereas the pulses 164 are determined to be too broad and are excluded (since those broad pulses may be caused by backscatter from the foreground or background). Also, the repetition interval of the pulses 166 is not the same as the repetition interval of the pulses 162 and 164 and similarly may be discarded (since those pulse may result from being generated by a different designator or may be counter-measures from another source). Thus, target discrimination may be provided.

The optical sensor 20 also can be configured to provide an image of the background scene, in addition to determining the locations of the short pulses or flashes of light received from the scene, by combining the LEPSD array 60 and corresponding electronics together with an infrared imaging detector array, such as illustrated in FIG. 1. For example, as described herein, the LEPSD array 60 may detect light of a shorter wavelength than the imaging array (e.g., FPA detector 26). For example, the LEPSD array 60 may be fabricated from InGaAs/InP elements as described herein and detect light of 1.0-1.65 µm wavelength. The imaging FPA may detect light of mid-wave infrared (MWIR) wavelengths from 3-5 µm and/or light of long-wave infrared (LWIR) wavelengths from 8-12 µm.

The optical sensor 20 of various embodiments includes the array 60 of LEPSD elements 62, an optical imaging system (e.g., the focusing lens 22) and a light collecting aperture 30. It should be noted that the optical imaging system may be a lens or compound lens that focuses light collected by an optical aperture onto the LEPSD array 60.

In various embodiments, in operation, the LEPSD array 60 is located at the focal plane that is associated with the wavelength of light detected by the LEPSD array 60 and refracted and projected by the lens 22 onto the LEPSD array 60. Since the spot of light projected onto the LEPSD array 60 is sharply focused or nearly focused, the illuminated-spot locating detector 24 is tolerant to atmospheric effects such as turbulence and to occlusions at the input aperture 30. The speckle resulting from turbulence and the occlusions may produce a very non-uniform distribution of the light in the large-area spots that typically would be required for the optical detectors, such as the 4-quadrant detectors, of conventional AOA sensors. For the AOA sensor of various embodiments described herein, a smaller size spot makes the illuminated-spot locating detector 24 more tolerant to the turbulence effects and the occlusions at the input aperture. The size of the spot of light projected onto the LEPSD array 60 in some embodiments should be substantially smaller than the size of a LEPSD element 62 but larger than the spacing S between adjacent elements 62 (as depicted in FIG. 6).

To provide a compact, dual-mode AOA-determining, imaging sensor and also to facilitate the registration of the angle determination provided by the LEPSD array 60 and electronics with the image produced by the FPA detector and readout electronics, both arrays are placed in an in-line configuration such that both arrays share the same focusing lens 22 (or optical imaging system), receive light through the same collecting aperture 30, and have the same optical axis 28 as illustrated also in FIG. 1. The optical sensor 20 makes use of the realization that many optical materials used for making lenses that function over the wide wavelength range of 1-12 µm are dispersive. For example, a chalcogenide glass (e.g., GASIR 2) that has high optical transmission for the wavelength range of 1-14 µm has a refractive index of 2.63 at 1.5 µm wavelength, but a refractive index of 2.584 at 10 µm wavelength. Accordingly, unless complicated achromatic designs are used, the lenses define different focal planes for the 1-1.6 µm wavelength range detected by the AOA sensor and for the 3-5 µm or 8-12 µm wavelength range detected by the imager. Thus, the AOA sensor can be physically separate from the image detecting array and still have a focused spot of light projected onto the arrangement.

Figure 14:
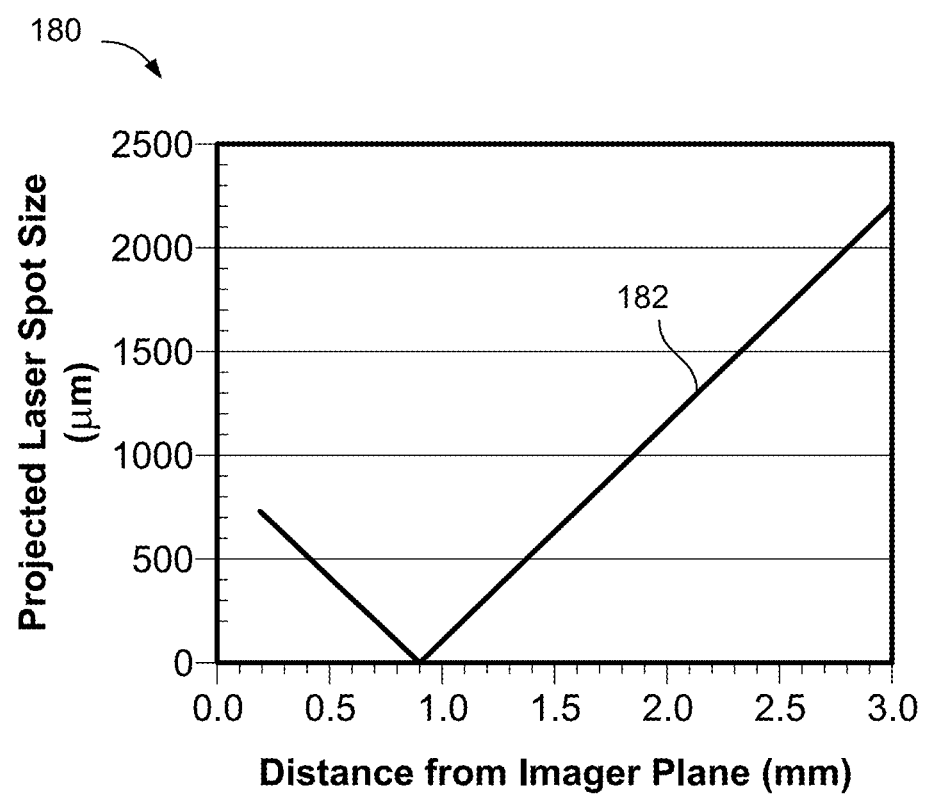
FIG. 14 is a graph of projected laser spot size relative to distance from an imager plane in accordance with an embodiment.

A lens material that has wideband transparency and generally has substantial dispersion (variation of its optical refractive index with the optical wavelength) may be used. Two examples of materials that are transparent for wavelengths between 1 and 12 µm are ZnSe and GASIR 2. GASIR 2 is a moldable chalcogenide glass. The dispersion of the lens material causes the focal plane for the light to be detected by the LEPSD array 60 (of the illuminate-spot locating detector 24) to be displaced closer to the lens 22 compared to the image plane of the imaging FPA detector 26. The plot 182 shown in the graph 180 of FIG. 14 was calculated for a GASIR 2 lens, and illustrates that the LEPSD array 60 in this embodiment should be displaced approximately 0.9 mm in front (closer to the lens 22) of an FPA imager that detects LWIR light. Since the LWIR light to be imaged first passes through the LEPSD array 60, the LEPSD array 60 has high transparency for the LWIR light in some embodiments. The choice of InGaAs/InP material and the design of the metal contacts, posts and interconnect lines on the LEPSD array 60 may be varied based on these or other design parameters or constraints. As described herein, the I/O pads of the LEPSD array 60 are at the periphery of that array and the TIA and interface electronics for the array of detectors can be located beyond the periphery of the detector array elements (unlike detector arrays that have the TIA and other electronics located directly underneath the detector array elements).

An example of a possible arrangement of the LEPSD array 60 and electronic circuitry is shown in FIG. 3. As described herein, the LEPSD array 60 can be mounted on an interconnect-base 74 having an opening 77 formed in a central portion with the LEPSD array 60 mounted upon the interconnect base 74 over the opening 77. Thus, the light to be detected by the imager is projected by the optical imaging system to pass through the detector portion of the LEPSD array 60, through the central opening of the interconnect base 74, and onto the imager. The electronic TIA, interface and summing circuits are mounted upon the interconnect base 74 away from the central portion of the interconnect base 74. Solder bumps or other known means for chip-to-chip or chip-to-base coupling can be used to electrically couple the I/O pads of the LEPSD array 60 and the interconnect base 74. Additional solder bumps, etc. may be used to couple the interconnect base 74 to the various electronic circuits.

Variations and modifications are contemplated. For example, although the LEPSD array 60 based on InGaAs/InP materials have been used in various embodiments, the AOA sensor also can have LEPSD arrays 60 that are fabricated from other materials. For example, a LEPSD array 60 that has an InAsSb absorber layer and InAlAsSb, GaAlSb, GaAlAsSb or GaSb lateral current conducting layers grown on a GaSb substrate would enable detection of MWIR light. These materials also would be transparent to LWIR light that may then be detected by an imaging FPA that is combined with the LEPSD array 60. Other materials such as various forms of HgCdTe also may be used for the LEPSD array.

In addition to the resistive-feedback TIA described herein, other types of TIA circuits may be used as the pre-amplifier circuits between the outputs of a LEPSD element 62 and the noise-bandwidth limiting filters. Examples include capacitive-feedback TIA circuits (having a capacitance that is sufficiently low to permit the desired response bandwidth) and TIAs that have capacitive-dividers in the feedback paths.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as a floppy disk drive, optical disk drive, and the like. The storage device may also be other similar means for loading computer programs or other instructions into the computer or processor.

As used herein, the terms "system," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An angle-of-arrival (AOA) sensor comprising:
a focusing lens; and
an array of lateral-effect position sensing detector (LEPSD) elements, wherein the focusing lens is configured to focus light on the array, wherein each of the LEPSD elements comprises an absorber region that absorbs light of a first wavelength range that is focused on the LEPSD elements, each of the LEPSD elements further comprises at least one lateral current conducting layer that has a relatively low sheet resistance.

2. The AOA sensor of claim 1, wherein the sheet resistance of the at least one lateral current conducting layer is less than about 1000 Ω.

3. The AOA sensor of claim 1, wherein the sheet resistance of the at least one lateral current conducting layer is between about 100Ω and 500Ω.

4. The AOA sensor of claim 1, wherein each of the LEPSD elements further comprises two lateral current conducting layers and wherein each lateral current conducting layer has a relatively low sheet resistance.

5. The AOA sensor of claim 1, wherein the at least one lateral current conducting layer has transparency to the light of the first wavelength range.

6. The AOA sensor of claim 1, further comprising an image detecting array, wherein the image detecting array absorbs light of a second wavelength range that is different from the first wavelength range.

7. The AOA sensor of claim 6, wherein the absorber region and the at least one lateral current conducting layer of the LEPSD has transparency to the light of the second wavelength range.

8. The AOA sensor of claim 1, further comprising a substrate on which the LEPSD elements are formed, the substrate having transparency to the light of both the first wavelength range and the second wavelength range.

9. The AOA sensor of claim 1, wherein the focusing lens defines a size of one or more nearly focused spots of light on the array of LEPSD elements.

10. The AOA sensor of claim 9, wherein the size of the one or more nearly focused spots of light is substantially smaller than a size of each LEPSD element.

11. The AOA sensor of claim 9, wherein the size of the one or more nearly focused spots of light is larger than 1 size of a gap between two adjacent LEPSD elements of the array of LEPSD elements.

12. The AOA sensor of claim 1, further comprising an image detecting array, and wherein the focusing lens produces a sharply focused image on the image detecting array.

13. The AOA sensor of claim 1, wherein the focusing lens is constructed from a wavelength-dispersive material such that a first focal plane for the light of the first wavelength range is located at a different spacing from the lens compared to the spacing of a second focal plane for the light of the second wavelength range.

14. The AOA sensor of claim 13, further comprising an image detecting array, and wherein the image detecting array is located approximately at the second focal plane and the array of LEPSD elements is located in proximity to the first focal plane.

15. The AOA sensor of claim 1, wherein the focusing lens is configured to project a spot of light on the array of LEPSD elements, wherein a size of the spot of light is larger than 5 μm and smaller than a desired spatial resolution of the array of LEPSD elements.

16. The AOA sensor of claim 1, wherein each of the LEPSD elements has four electrical outputs that are coupled to four associated electronic preamplifiers and noise-bandwidth limiting filters.

17. The AOA sensor of claim 1, wherein each of the LEPSD elements is coupled to a threshold detecting circuit that is configured to determine whether the photocurrent generated in an LEPSD element exceeds a threshold set-point value.

18. The AOA sensor of claim 17, wherein each of the LEPSD elements is coupled to electronic circuitry that is configured to determine the location of a spot of light illuminating the LEPSD elements, the electronic circuitry further producing an offset value indicative of a location of the LEPSD element in the array.

19. The AOA sensor of claim 18, wherein the electronic circuitry injects an additional amount of electrical current indicative of a location of the LEPSD element in the array.

20. The AOA sensor of claim 1, wherein each of the LEPSD elements is coupled to electronic circuitry that is configured to determine the location of a spot of light illuminating that LEPSD elements and wherein the electronic circuitry for each element is coupled to a summing amplifier that combines the output signals from multiple LEPSD elements to produce a set of output signals that represent a location, along one of two orthogonal axes, of the illuminated spot on an overall area of the array.

21. The AOA sensor of claim 1, wherein the electrical output signals from the array appears as an output from an equivalent single LEPSD having a light-detecting area that is equivalent to an overall area occupied by multiple adjacent LEPSD elements of the array.

22. The AOA sensor of claim 1, wherein a response bandwidth of the array is determined by a bandwidth of a single LEPSD element and an associated preamplifier circuit and noise-bandwidth limiting filter.

23. The AOA sensor of claim 1, further comprising an image detecting array, and wherein the LEPSD elements are configured to detect laser light of the first wavelength range, wherein the first wavelength range is between about 1.06 μm and 1.65 μm, and the image-detecting array is configured to detect light of the second wavelength range, the second wavelength being longer than the first wavelength and in a range between about 8 μm and 12 μm, or between about 3 μm and 5 μm, or between about 3 μm and 12 μm.

24. The AOA sensor of claim 23, further comprising a wavelength-selective anti-reflective film that couples light to the absorber region, wherein the wavelength-selective anti-reflective film is configured to transmit light of two wavelengths within the first wavelength range and light of the second wavelength range and also configured to not transmit light that is outside the first wavelength range and the second wavelength range.

25. The AOA sensor of claim 1, further comprising an image detecting array, and wherein the LEPSD elements are configured to detect laser light of the first wavelength range, wherein the first wavelength range is between about 3 μm and 5 μm, and the image-detecting array is configured to detect light of the second wavelength range, the second wavelength being longer than the first wavelength and in a range between about 8 μm and 12 m.

26. The AOA sensor of claim 1, further comprising electrical input/output contact pads located at a periphery of the LEPSD elements, wherein the array includes electrical interconnect lines between the LEPSD elements and the input/output contact pads, the interconnect lines having a sub-wavelength width for light of the second wavelength range, the interconnect lines being arranged to increase the transmission of light of the second wavelength range through the LEPSD elements.

27. The AOA sensor of claim 1, wherein the array of LEPSD elements is mounted on an electrical-interconnect base that has an opening formed in a central potion, with the array mounted over the central portion.

28. The AOA sensor of claim 27, further comprising electronic preamplifiers, spot location determining circuits, and a summing amplifier all mounted on the electrical-interconnect base a distance from the central portion, the electrical-interconnect base having electrical interconnect paths between the LEPSD elements and the electronic preamplifiers.

29. The AOA sensor of claim 27, further comprising an image detecting array, and wherein the light to be detected by the image detecting array is projected by the focusing lens to pass through the array of LEPSD elements, through the central portion in the electrical-interconnect base, and onto the image detecting array.

30. The AOA sensor of claim 1, wherein each of the LEPSD elements is coupled to electronic circuitry that is configured to determine the location of a spot of light illuminating that LEPSD elements and output a continuous waveform signal representative of the location of the spot.

31. An optical sensor comprising:
a focusing lens;
a lateral-effect position sensing detector (LEPSD) array; and
an image detecting array, wherein the focusing lens, LEPSD array and image detecting array are arranged in an in-line configuration, the focusing lens configured to focus a spot of light on the LEPSD array and an image on the image detecting array, and wherein the LEPSD array is separated from the image detecting array with the LEPSD array located closer to the focusing lens than the image detecting array.

32. The optical sensor of claim 31, wherein the LEPSD array is separated from the image detecting array by a distance of at least 0.2 mm.

33. The optical sensor of claim 31, wherein the focusing lens is constructed from a wavelength dispersive material such that a first focal plane for light of a first wavelength range that is detected by the LEPSD array is located at a different spacing from the focusing lens than a spacing of a second focal plane for light of a second wavelength range that is detected by the image detecting array.

34. The optical sensor of claim 31, wherein the image detecting array is located approximately at the second focal plane and the LEPSD array is located in proximity to the first focal plane, the LEPSD array absorbing light of the first wavelength range and having a transparency to light of the second wavelength range.

35. The optical sensor of claim 31, wherein the LEPSD array comprises metal interconnect lines having a width that is smaller than the second wavelength range and arranged to increase the transmission of light of the second wavelength range through the LEPSD array.

* * * * *